(12) United States Patent
Tan et al.

(10) Patent No.: US 9,187,604 B1
(45) Date of Patent: Nov. 17, 2015

(54) HYPERBRANCHED POLY(ETHER-KETONES) VIA AN A3 + B2 POLYMERIZATION METHOD

(71) Applicant: The United States of America, as represented by the Secretary of the Air Force, Washington, DC (US)

(72) Inventors: Loon-Seng Tan, Centerville, OH (US); Jong-Beom Baek, Ulsan (KR)

(73) Assignee: THE UNITED STATES OF AMERICA, AS REPRESENTED BY THE SECRETARY OF THE AIR FORCE, Washington, DC (US)

( * ) Notice: Subject to any disclaimer, the term of this patent is extended or adjusted under 35 U.S.C. 154(b) by 0 days.

(21) Appl. No.: 14/209,047

(22) Filed: Mar. 13, 2014

Related U.S. Application Data

(63) Continuation-in-part of application No. 12/644,058, filed on Dec. 22, 2009, now abandoned, which is a continuation-in-part of application No. 11/357,466, filed on Feb. 13, 2006, now abandoned.

(60) Provisional application No. 60/656,507, filed on Feb. 25, 2005.

(51) Int. Cl.
*C08G 83/00* (2006.01)

(52) U.S. Cl.
CPC .................................. *C08G 83/005* (2013.01)

(58) Field of Classification Search
None
See application file for complete search history.

(56) References Cited

PUBLICATIONS

Baek et al., Efficient synthesis of hyperbranched polyetherketones (PEKs) from A3 + B2 polymerization by using different monomer solubility in reaction medium, Polymer Preprints (American Chemical Society, Division of Polymer Chemistry) (2004), 45(1), 1032-1033.*

* cited by examiner

*Primary Examiner* — Jeffrey Mullis

(74) *Attorney, Agent, or Firm* — AFMCLO/JAZ; James P. Carey

(57) ABSTRACT

The present invention includes novel ether-ketone hyperbranched polymers that are prepared from polymerizing trimesic acid and bifunctional phenylether-based liquid or low-melting monomers, which melt at or below polymerization temperature. The resulting copolymer has repeating units of the formula:

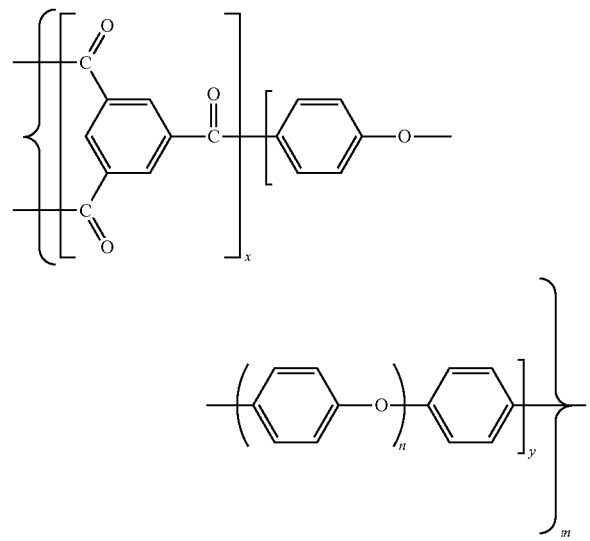

wherein m is the degree of polymerization; n has a value of 0-5; the ratio x:y corresponds to the molar ratio of trimesic acid and arylether monomer and may range from 1.0:1.0 to 1.0:1.5 (i.e. x=1, y=1.0, 1.1, 1.2 . . . 1.5); and the substitution pattern of the arylether segment may be para or meta. The endgroups may be carboxylic acid ($-CO_2H$), oxyphenyl ($-OPh$), or mixture of both moieties, depending on the reaction ratio x:y used. The total number of endgroups is typically defined by m+1.

13 Claims, No Drawings

HYPERBRANCHED POLY(ETHER-KETONES) VIA AN A3 + B2 POLYMERIZATION METHOD

CROSS-REFERENCE TO RELATED APPLICATIONS

This application is a continuation-in-part of, and claims priority from, co-pending U.S. patent application Ser. No. 12/644,058, filed Dec. 22, 2009, which is a continuation-in-part of U.S. patent application Ser. No. 11/357,466, filed Feb. 13, 2006 (now abandoned), which claims the benefit of U.S. Provisional Application No. 60/656,507, filed Feb. 25, 2005, all of which are herein incorporated by reference in their entirety.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to ether-ketone polymers, particularly to hyperbranched ether-ketone polymers and a new technique to synthesize them from the mixtures of a trifunctional carboxylic acid ($A_3$) and a difunctional bis (arylether) ($B_2$) monomers in appropriate stoichiometric ratios.

2. Description of the Related Art

Non-traditional macromolecules such as dendrimers and hyperbranched polymers are attracting a considerable amount of attention primarily because of their distinctly different properties compared to their linear counterparts. For example, they have better solubility compared to their linear analogs. Although dendrimers have precisely controlled structure and unique properties, their preparations generally involve tedious, multi-step sequences that are not practical in mass production. Synthesis of a hyperbranched polymer, on the other hand, is a one-pot process. Large quantities of hyperbranched polymers can be easily produced from $AB_x$ ($x \geq 2$) monomers. In addition, there are important characteristics such as low viscosity and dependence of the physical properties on the nature and number of endgroups such as solubility, glass-transition etc. are quite similar between hyperbranched polymers and dendrimers. Therefore, hyperbranched polymers are better suited for many practical applications. Perhaps an important disadvantage associated with a particular hyperbranched polymer is that the synthesis of its $AB_x$ monomer often time still involves several reaction sequences from commercially available starting materials.

To be more cost-competitive, a promising approach entails direct syntheses of hyperbranched polymers for high temperature applications from commercially available $A_3$ and $B_2$ or $A_2$ and $B_3$. Although a number of hyperbranched polymers have been synthesized via either an $A_3+B_2$ or an $A_2+B_3$ polycondensation process, these processes did present some difficulty in controlling polycondensation reaction due to premature gelation. Thus, an important key to the success of such an approach is to be able to: (a) control the reaction conditions such as the monomer concentrations and their time-dependent reaction ratio; and (b) stop the reaction before the gelation starts.

SUMMARY OF THE INVENTION

In accordance with the present invention there are provided new ether-ketone hyperbranched polymers formed by polymerizing trimesic acid and bifunctional phenylether-based liquid or low-melting monomers, which melts at or below polymerization temperature.

The resulting polymer has repeating units of the formula:

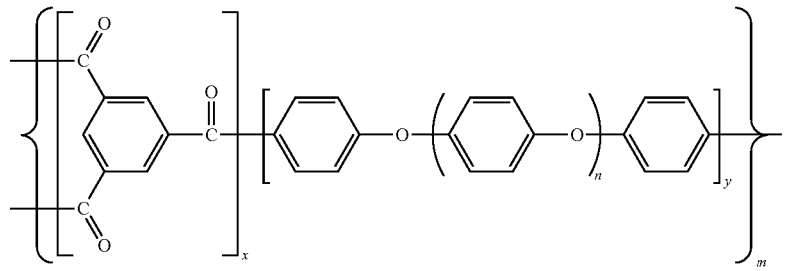

in which m is the degree of polymerization; n has a value of 0-5; the ratio x:y corresponds to the molar ratio of trimesic acid:arylether monomer and may range from 1.0:1.0 to 1.0:1.5 (i.e. x=1, y=1.0, 1.1, 1.2 . . . 1.5); and the substitution pattern of the arylether segment may be para or meta. The endgroups may be carboxylic acid (—$CO_2H$), oxyphenyl (—OPh), or mixture of both moieties, depending on the reaction ratio x:y used. The total number of endgroups is typically defined by m+1.

It is an object of the present invention to provide a process for the preparation of hyperbranched poly(ether-ketones) via polymerization of an aromatic triacid monomer ($A_3$) and a liquid or low-melting bis(arylether)-based monomer, which melts at or below polymerization temperature. The important benefit of the approach is to reduce the manufacturing cost by taking the advantage of the ease in controlling molecular weight and in preventing gelation via the vast difference in solubility of the co-monomers in polyphosphoric acid/phosphorus pentoxide (PPA/$P_2O_5$) reaction medium. The hydrophilic triacid monomer more readily dissolves in hydrophilic PPA/$P_2O_5$ than does the hydrophobic bis(arylether) monomer. As a result, the latter separates from the polymerization medium and forms a liquid top layer. The ensuing polycondensation is taking place at the interface with slow feed of the bis(arylether) monomer into the polymerization medium containing the growing polymer chains and the triacid monomer.

It is another object of this invention to provide hyperbranched polymers based on trimesic acid (1,3,5-benzenetricarboxylic acid) and bifunctional arylether-based liquid or low-melting monomers, which melt at or below polymerization temperature.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

DETAILED DESCRIPTION OF THE INVENTION

Friedel-Crafts polymerization of the triacid ($A_3$) and bis (arylether) ($B_2$) monomers can be conducted in PPA at a polymer concentration of about 5 weight percent at a temperature of about 130° C. Preliminarily, it is helpful to describe the chemistry of phosphoric acids and strong phosphoric acids or polyphosphoric acids as follows: As used herein the term "phosphoric acid(s)" means commercial phosphoric acid(s) containing 85-86% $H_3PO_4$. The strong phosphoric acids or polyphosphoric acids referred to as PPA are members of a continuous series of amorphous condensed phosphoric acid mixtures given by the formula:

or

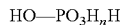

where the value of n depends on the molar ratio of water to phosphorus pentoxide present.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with $P_2O_5$ and adding an appropriate amount of water.

All polyphosphoric acid compositions can be described as a ratio of $P_2O_5$ and water by reducing the various species present (on paper) to $P_2O_5$ and water. The present application will then use the convention that polyphosphoric acid composition may be expressed in terms of a $P_2O_5$ content (as a percentage) defined as $P_2O_5$ content:

(weight of $P_2O_5$)/(weight of $P_2O_5$+weight of water)×100   i.

Thus, the $P_2O_5$ content of pure orthophosphoric acid could be derived by reducing one mole of $H_3PO_4$ to 0.5 moles $P_2O_5$+1.5 moles $H_2O$. Converting to weights gives the $P_2O_5$ content as:

(0.5*142)/((0.5*142)+(1.5*18.01))*100%=72.4%   ii.

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid may then be calculated knowing the $P_2O_5$ content of 100% $H_3PO_4$:

(115 g/100 g)*72.4%=83.3%   iii.

It was found that the rate of polymerization may be accelerated by adding about 25% additional $P_2O_5$ (relative to the weight of PPA) to the polymerization mixture. In addition, the polymerization method has a built-in ease in controlling molecular weight and in preventing gelation because of the vast difference in solubility of the co-monomers in PPA/$P_2O_5$ reaction medium. The more polar triacid monomer dissolves in PPA/$P_2O_5$ more readily than the hydrophilic bis(arylether) monomer does. As a result, the latter separates from the polymerization medium and forms a liquid top layer. The ensuing polycondensation is taking place at the interface with slow feeding of the bis(arylether) monomer into the polymerization medium containing the growing polymer chains and the triacid monomer. Herein, a novel method is described for synthesizing hyperbranched ether-ketone polymers that involves heating a mixture of trimesic acid and a liquid or low-melting bis(arylether)-based monomer, which melts at or below the polymerization temperature, with the generic structural formula:

wherein n has a value of from 0-5 and wherein the substitution pattern of the oxygen atoms bonded to the same benzene ring can be para or meta, in a polymerization medium consisting of polyphosphoric acid with 83% $P_2O_5$ content with 25 weight percent of additional $P_2O_5$ relative to said polyphosphoric acid to a temperature of about 130° C. for about 24 hours and recovering the resulting polymer.

It should be noted that in common practice, the synthesis of branched copolyetherketones via Friedel-Crafts acylation reaction typically requires: (i) aluminum chloride or boron trifluoride as a catalyst; (ii) a copolymerization of three (3) or more co-monomers, e.g. one or more diacid chloride, diphenylether, and a multifunctional acid chloride [i.e., number of acid chloride (COCl) per molecule is 3-6]; and (iii) a suitable solvent such as nitrobenzene, carbon disulfide, a chlorinated solvent (chlorobenzene, o-dichlorobenzene, methylene chloride, etc.), or anhydrous hydrogen fluoride when boron trifluoride is used as a catalyst. Thus, diacid chloride such as terephthalic acid (para-phenylenedicarboxylic acid) or isophthalic acid (meta-phenylenedicarboxylic acid), diphenylether and 1,3,5-benzene tricarboxylic acid chloride (trimesic acid chloride) were preferred. In contrast, the hyperbranched ether-ketone polymers herein are derived from copolymerization of only two (2) co-monomers in a single-component medium, namely polyphosphoric acid, which serves as both the Friedel-Crafts catalyst and solvent.

The polymers of this invention are suitable for use in applications where the material will be subject to high service temperatures, e.g., electrical connector moldings.

The following Examples illustrate the invention:

Example 1

Polymerization of Trimesic Acid
($A_3$)+1,4-Diphenoxybenzene ($B_2$) in 1:1
Stoichiometric Ratio Into a 250 ml resin flask equipped with a high torque mechanical stirrer and nitrogen inlet and outlet, pressure regulator, and side opening for reagent addition, polyphosphoric acid (PPA, 60 g) was charged. Then a mixture of the monomers, trimesic acid (2.10 g, 10 mmol) and 1,4-diphenoxybenzene (2.62 g, 10 mmol) were introduced. The mixture was stirred at 70° C. for 12 hours to monitor solubility of monomers. Crystals of trimesic acid were not dissolved in the medium; 1,4-diphenoxybenzene was melted, isolated, and floated on the reaction mixture. Then, $P_2O_5$ (15 g) was added in one portion, well mixed, and the resulting reaction mixture was heated to 130° C. After 24 hours, the mixture became homogeneous and stuck to the stirring rod. After the reaction mixture had been allowed to cool down, water was added to the mixture and warmed up again at 60-70° C. overnight under the nitrogen. The resulting pink solids were collected by suction filtration, washed with 5% hydrochloric acid, and large amount of water. The polymer was further Soxhlet-extracted with water for 2 days, methanol for 2 days, and finally dried under reduced pressure (0.05 mm Hg) at 100° C. for 150 hours to give 3.30 g (76% yield) of pink powder: $[\eta]=0.36$ dL/g (0.5% solution in MSA at 30.0±0.1° C.). Anal. Calcd. for $C_{27}H_{16}O_6$: C, 74.31%; H, 3.70%; O, 22.00%. Found: C, 74.19%; H, 4.25%; O, 20.04%.

Example 2

Polymerization of Trimesic Acid ($A_3$)+1,4-Diphenoxybenzene ($B_2$) in 2:3 Stoichiometric Ratio Into 250 ml resin flask equipped with a high torque mechanical stirrer and nitrogen inlet and outlet, pressure regulator, and side opening for reagent addition, polyphosphoric acid (PPA, 60 g) was charged. Then a mixture of the monomers, trimesic acid (2.10 g, 10 mmol) and 1,4-diphenoxybenzene (3.93 g, 15 mmol) were introduced. The mixture was stirred at 70° C. for 12 hours to monitor solubility of monomers. Crystals of trimesic acid were not dissolved in the medium; 1,4-diphenoxybenzene was melted, isolated, and floated on the reaction mixture. Then, $P_2O_5$ (15 g) was added in one portion, well mixed, and the resulting reaction mixture was heated to 130° C. After 24 hours, the mixture became homogeneous and stuck to the stirring rod. After the reaction mixture had been allowed to cool down, water was added to the mixture and warmed up again at 60-70° C. overnight under the nitrogen. The resulting pink solids were collected by suction filtration, washed with 5% hydrochloric acid, and large amount of water. The polymer was further Soxhlet-extracted with water for 2 days, methanol for 2 days, and finally dried under reduced pressure (0.05 mm Hg) at 100° C. for 150 hours to give 2.6 g (88% yield) of pink powder: $[\eta]=0.38$ dL/g (0.5% solution in MSA at 30.0±0.1° C.). Anal. Calcd. for $C_{28.8}H_{17.6}O_{5.6}$: C, 76.32%; H, 3.91%; O, 19.77%. Found: C, 74.70%; H, 4.15%; O, 19.90%.

Example 3

Polymerization of Trimesic Acid ($A_3$)+Diphenyl ether ($B_2$) in 1:1 Stoichiometric Ratio Into 250 ml resin flask equipped with a high torque mechanical stirrer and nitrogen inlet and outlet, pressure regulator, and side opening for reagent addition, polyphosphoric acid (PPA, 60 g) was charged. Then a mixture of the monomers, trimesic acid (2.10 g, 10 mmol) and 1,4-diphenoxybenzene (2.62 g, 10 mmol) were introduced. The mixture was stirred at 70° C. for 12 hours to monitor solubility of monomers. Crystals of trimesic acid were not dissolved in the medium; 1,4-diphenoxybenzene was melted, isolated, and floated on the reaction mixture. Then, $P_2O_5$ (15 g) was added in one portion, well mixed, and the resulting reaction mixture was heated to 130° C. After 24 hours, the mixture became homogeneous and stuck to the stirring rod. After the reaction mixture had been allowed to cool down, water was added to the mixture and warmed up again at 60-70° C. overnight under the nitrogen. The resulting pink solids were collected by suction filtration, washed with 5% hydrochloric acid, and large amount of water. The polymer was further Soxhlet-extracted with water for 2 days, methanol for 2 days, and finally dried under reduced pressure (0.05 mm Hg) at 100° C. for 150 hours to give 5.30 g (77% yield): $[\eta]=0.51$ dL/g (0.5% solution in MSA at 30.0±0.1° C.). Anal. Calcd. for $C_{21}H_{12}O_3$: C, 73.25%; H, 3.51%; O, 23.23%. Found: C, 76.61%; H, 4.36%; O, 17.94%.

Example 4

Polymerization of Trimesic Acid ($A_3$)+Diphenyl ether ($B_2$) in 2:3 Stoichiometric Ratio Into 250 ml resin flask equipped with a high torque mechanical stirrer and nitrogen inlet and outlet, pressure regulator, and side opening for reagent addition, polyphosphoric acid (PPA, 60 g) was charged. Then a mixture of the monomers, trimesic acid (2.10 g, 10 mmol) and diphenyl ether (2.55 g, 15 mmol) were introduced. The mixture was stirred at 70° C. for 12 hours to monitor solubility of monomers. Crystals of trimesic acid were not dissolved in the medium; diphenyl ether was melted, isolated, and floated on the reaction mixture. Then, $P_2O_5$ (15 g) was added in one portion, well mixed, and the resulting reaction mixture was heated to 130° C. After 24 hours, the mixture became homogeneous and stuck to the stirring rod. After the reaction mixture had been allowed to cool down, water was added to the mixture and warmed up again at 60-70° C. overnight under the nitrogen. The resulting pink solids were collected by suction filtration, washed with 5% hydrochloric acid, and large amount of water. The polymer was further Soxhlet-extracted with water for 2 days, methanol for 2 days, and finally dried under reduced pressure (0.05 mm Hg) at 100° C. for 150 hours to give 1.85 g (83% yield) of pink powder: $[\eta]=0.20$ dL/g (0.5% solution in MSA at 30.0±0.1° C.). Anal. Calcd. for $C_{21.6}H_{12.8}O_{4.4}$: C, 75.70%; H, 3.76%; O, 20.54%. Found: C, 78.19%; H, 4.19%; O, 17.21%.

Example 5

Solution and Thermal Properties

The polymers (Examples 1-4) were soluble in polar aprotic solvents such as N,N-dimethylformamide (DMF), N,N-dimethylacetamide (DMAc), dimethyl sulfoxide (DMSO), and N-methyl-2-pyrrolidone (NMP), and there were no insoluble gels observed when the reaction was stopped immediately after the mixture had become homogeneous. However, all polymer examples were only partially soluble in acetone. In addition, their NMP solutions displayed polyelectrolyte effects indicated by the observation that as each polymer concentration decreased, both the reduced and inherent viscosities also increased drastically and asymptotically.

The Differential Scanning calorimetry samples (powder form) were subjected to two cycles of heating from room temperature to 360° C. and then cooling to 20° C., with the same rate of 10° C./min. The glass transition temperature ($T_g$) value was taken as the mid-point of the maximum baseline shift from each run. The hyperbranched PEK Example 1 ($[\eta]=0.36$ dL/g) exhibited $T_g$ at 279° C. The $T_g$ of hyperbranched PEK Example 3 ([η]=0.51 dL/g), which has the same structural unit as Example 1 with different composition, was shifted to 330° C. The hyperbranched PEK Example 2 ([η]=0.38 dL/g) exhibited $T_g$ at 262° C. The $T_g$ of hyperbranched PEK Example 4 ([η]=0.20 dL/g), which also has the same structural unit as Example 2 with different composition, was shifted to 307° C. These systems displayed two noteworthy thermal behaviors. One is that the $T_g$'s of Examples 1 and 2 were expected to be lower than those of Examples 3 and 4, as the former hyperbranched polymers have an additional, supposedly flexible ether linkage in each repeat unit. Apparently, the para-phenoxy-phenylene-para-phenoxy moiety has a more rigid conformation than the 4,4'-diphenylether moiety. The other is that the $T_g$'s of Examples 2 and 4 were also expected to be lower an those of 1 and 3, as the former hyperbranched polymers have larger number of carboxylic acids as endgroups for hydrogen bonding.

Having thus described exemplary embodiments of the present invention, it should be noted by those skilled in the art that the disclosures herein are exemplary only and that alternatives, adaptations and modifications may be made within the scope of the present invention.

What is claimed is:

1. An ether-ketone hyperbranched polymer having repeating units of the formula:

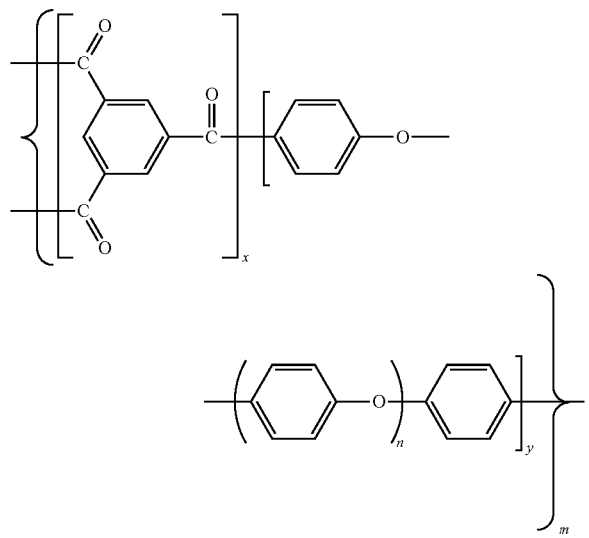

wherein m is a degree of polymerization; wherein n has a value of 0 or 1; wherein a ratio x:y corresponds to a molar ratio of a trimesic acid segment to an arylether segment and is in a range from 1:1 to 1:1.5; and wherein a substitution pattern of the arylether segment is para.

2. The ether-ketone hyperbranched polymer of claim 1, wherein n has a value of 0.

3. The ether-ketone hyperbranched polymer of claim 1, wherein n has a value of 1.

4. The ether-ketone hyperbranched polymer of claim 1, wherein the ratio x:y is 1:1.

5. The ether-ketone hyperbranched polymer of claim 1, wherein the ratio x:y is 1:1.5.

6. A method of synthesizing the ether-ketone hyperbranched polymer of claim 1, comprising:

heating a mixture consisting essentially of trimesic acid and an arylether monomer selected from 1,4-diphenoxybenzene or diphenyl ether in a polymerization medium comprising polyphosphoric acid and $P_2O_5$; and isolating the ether-ketone hyperbranched polymer.

7. The method of claim 6, wherein the $P_2O_5$ is present in the polymerization medium in 25 wt %, wherein wt % is based on the weight of the polyphosphoric acid.

8. The method of claim 6, wherein heating the mixture is performed to a temperature of 130° C.

9. An ether-ketone hyperbranched copolymer prepared by heating a mixture consisting essentially of trimesic acid and an arylether monomer selected from 1,4-diphenoxybenzene or diphenyl ether in a polymerization medium comprising polyphosphoric acid and $P_2O_5$, wherein a molar ratio between a trimesic acid segment and an arylether monomer segment in the copolymer is in a range from 1:1 to 1:1.5.

10. The ether-ketone hyperbranched copolymer of claim 9, wherein the arylether monomer is diphenyl ether.

11. The ether-ketone hyperbranched copolymer of claim 9, wherein the arylether monomer is 1,4-diphenoxybenzene.

12. The ether-ketone hyperbranched copolymer of claim 9, wherein the molar ratio is 1:1.

13. The ether-ketone hyperbranched copolymer of claim 9, wherein the molar ratio is 1:1.5.

* * * * *